(12) United States Patent
Dangelmaier et al.

(10) Patent No.: US 7,189,009 B2
(45) Date of Patent: Mar. 13, 2007

(54) MICRO-OPTICAL MODULE WITH HOUSING AND METHOD FOR PRODUCING THE SAME

(75) Inventors: Jochen Dangelmaier, Beratzhausen (DE); Horst Theuss, Wenzenbach (DE); Helmut Wietschorke, Regensburg (DE)

(73) Assignee: Infineon Technologies, AG, Munich (DE)

( * ) Notice: Subject to any disclaimer, the term of this patent is extended or adjusted under 35 U.S.C. 154(b) by 0 days.

(21) Appl. No.: 11/273,264

(22) Filed: Nov. 15, 2005

(65) Prior Publication Data

US 2006/0088256 A1 Apr. 27, 2006

Related U.S. Application Data

(63) Continuation of application No. PCT/DE04/00944, filed on May 5, 2004.

(30) Foreign Application Priority Data

May 15, 2003 (DE) .................... 103 22 071

(51) Int. Cl.
G02B 6/42 (2006.01)
G02B 6/43 (2006.01)
(52) U.S. Cl. ............................ 385/88; 92/94
(58) Field of Classification Search ............. 385/33, 385/49, 88, 92, 75
See application file for complete search history.

(56) References Cited

U.S. PATENT DOCUMENTS

| | | | |
|---|---|---|---|
| 4,439,006 A | 3/1984 | Stevenson | |
| 4,478,479 A | 10/1984 | Cherry et al. | |
| 4,913,511 A | 4/1990 | Koens et al. | |
| 5,050,953 A | 9/1991 | Anderson et al. | |
| 5,071,223 A | 12/1991 | Gotoh et al. | |
| 5,113,466 A | 5/1992 | Acarlar et al. | |
| 5,123,066 A | 6/1992 | Acarlar | |
| 5,132,532 A | 7/1992 | Watanabe | |
| 5,359,208 A | 10/1994 | Connolly et al. | |
| 5,872,881 A | 2/1999 | Ransom et al. | |
| 6,407,438 B1 | 6/2002 | Severn | |
| 6,478,475 B2 | 11/2002 | Bardountiotis et al. | |
| 6,478,479 B1 | 11/2002 | Choi et al. | |
| 6,550,983 B1 | 4/2003 | Gilliland et al. | |
| 6,813,418 B1 * | 11/2004 | Kragl ........................ | 385/49 |
| 6,832,861 B2 * | 12/2004 | Kragl ........................ | 385/88 |

FOREIGN PATENT DOCUMENTS

| | | |
|---|---|---|
| DE | 198 45 703 A1 | 4/2000 |
| DE | 10023463 | 12/2001 |
| DE | 19921659 C2 | 3/2002 |
| DE | 59901089 | 5/2002 |
| DE | 10059761 A1 | 6/2002 |
| EP | 330231 A | 8/1989 |
| EP | 1 160 875 A1 | 12/2001 |

(Continued)

*Primary Examiner*—Michelle Connelly-Cushwa
(74) *Attorney, Agent, or Firm*—Edell, Shapiro & Finnan, LLC

(57) ABSTRACT

A micro-optical module includes a housing, at least one optoelectronic component, and an optoelectronic unit assigned thereto. The housing is partly embodied as an MID body, having a cavity and having a three-dimensional conductor structure in the cavity. The MID body includes an optical channel filled with a plastic waveguide.

9 Claims, 3 Drawing Sheets

FOREIGN PATENT DOCUMENTS

| | | |
|---|---|---|
| EP | 1209959 A2 | 5/2002 |
| JP | 02012115 A | 1/1990 |
| JP | 05251717 A | 9/1993 |
| JP | 06273640 | 9/1994 |
| JP | 07287146 A | 10/1995 |
| JP | 10335854 A | 12/1998 |
| JP | 11077714 A | 3/1999 |
| JP | 2000-322990 | 11/2000 |
| JP | 2001-267593 A | 9/2001 |
| JP | 2001342271 A | 12/2001 |
| JP | 2001345533 A | 12/2001 |
| JP | 2002185068 A | 6/2002 |
| JP | 2002243992 A | 8/2002 |
| WO | WO 00/55665 | 9/2000 |
| WO | WO 2004/031817 A2 | 4/2004 |

* cited by examiner

MICRO-OPTICAL MODULE WITH HOUSING AND METHOD FOR PRODUCING THE SAME

CROSS REFERENCE TO RELATED APPLICATIONS

This application is a continuation of PCT/DE2004/000944, filed, May 5, 2004, and titled "Micro-Optical Module with Injection-Molded Housing and Method for the Production Thereof," which claims priority under 35 U.S.C. §119 to German Application No. DE 103 22 071.2, filed on May 15, 2003, and titled "Micro-Optical Module with Housing and Method for the Production Thereof," the entire contents of which are hereby incorporated by reference.

FIELD OF THE INVENTION

The invention relates to a micro-optical module with a housing, which has at least one optoelectronic component and an optoelectronic unit assigned to the component.

BACKGROUND

Optical modules are constructed and assembled in modular fashion from a plurality of components. An optical module of this type, as is known from U.S. Pat. No. 4,478,479, has an optics module, a housing component, and a connector component. These components are assembled to form an optical module. The optics module has a receptacle opening with an inserted housed light transmission element with an additionally attached transmission focusing device and a further receptacle opening with a housed light reception element with an additionally attached reception focusing device. The housing component has two optical paths, a transmission path and a reception path with bent optical fiber pieces of a fiber-optic waveguide, which can be inserted into the connector component and can be coupled to two fiber strands of a waveguide with the aid of the connector component.

One disadvantage of such an optical module assembled from the above components is the space requirement, which limits miniaturization. A further disadvantage is the diversity of the components whose tolerances may not fulfill the optical coupling requirements, making optical adaptation and orientation difficult and complicated and representing a permanent source of faults.

SUMMARY

According to an exemplary embodiment of the invention, a micro-optical module that overcomes the above disadvantages and permits more extensive miniaturization comprises a housing, which contains at least one optoelectronic component and an optoelectronic unit assigned thereto. Moreover, the housing is at least partly embodied as a molded interconnect device (MID) body. Furthermore, the micro-optical module has a three-dimensional conductor structure by which the components distributed three-dimensionally in the optoelectronic module are electrically connected to one another.

Such a micro-optical module of MID design has the advantage that, due to a molding technique that has been further developed, a compact device is available which inherently combines a plurality of previously insertable components. This obviates any subsequent adjustment and any optical adaptation of the components with respect to one another. The MID body forms a compact unit and possesses the entire three-dimensional electrical conductor structure except for the optoelectronic unit with active and passive components which is to be mounted subsequently, and also the optoelectronic component which is to be incorporated subsequently. The conductor structure interconnects the spatially distributed electronic and optoelectronic components in the micro-optical module and connects them toward the outside to an external contact region.

Furthermore, the micro-optical module has the advantage that it is possible to incorporate in its cavity with a three-dimensional conductor structure semiconductor chips with external contact areas as optoelectronic and/or electro-optical components, and also electronic components without additional housings, with the result that more extensive miniaturization becomes possible.

At least one cavity surrounded by walls may be provided in the interior of the MID body, and the walls may have a portion of the three-dimensional conductor structure. Furthermore, the walls of the cavity may be equipped with components of the optoelectronic unit. The interior of the MID body is thus utilized intensively, especially as the arrangement of the components does not just extend to a planar printed circuit board. Rather, due to the three-dimensional conductor structure, all of the walls of the cavity in the interior of the MID body are used and equipped.

Furthermore, the housing may have an outer wall bearing a shielding layer. Such a shielding layer on the MID body ensures protection against magnetic, electromagnetic and/or corpuscular radiation. Moreover, it prevents crosstalk from one micro-optical module to another micro-optical module.

The housing comprises at least one receptacle opening for inserting a radiation conductor in an insertion region. A radiation conductor may guide and conduct not only visible electromagnetic waves but also IR, UV, or X-ray radiation. Instead of a radiation conductor, the insertion region may also be formed in such a way that an optical transmitter such as a laser diode or some other optical emitter can be inserted.

The housing may furthermore have an optical channel which is filled with a plastic waveguide and is optically coupled to the receptacle opening in the insertion region. Such a plastic waveguide can be molded into the MID body, thus making it unnecessary to effect subsequent adjustment for a plastic waveguide extending three-dimensionally.

In this case, the optical channel is completely filled by the plastic waveguide. Such a molded-in plastic waveguide differs from a three-dimensionally bent optical fiber piece of a fiber-optic waveguide firstly by virtue of its material, for example a moldable acrylic resin, which is less brittle than an optical fiber piece, and by virtue of its homogeneous material construction, in the case of which a gradual and radial increase in the refractive index over the cross section, as in the case of optical fiber pieces, does not occur, which can be compensated for by mirror-coating the cladding of the plastic waveguide.

A molded-in plastic waveguide advantageously can be adapted exactly to the requirements of a three-dimensional guiding of the optical signals in the micro-optical module. The cross section of the plastic waveguide is not restricted to the circular form of an optical fiber piece, with the result that square and/or rectangular and/or triangular cross-sectional forms can be realized. Furthermore, it is possible to provide prism forms and deflection mirror areas for the plastic waveguide.

Focusing devices may be molded into ends of the plastic waveguide, which focusing devices are fixed in terms of their optical orientation with the molding of the plastic waveguide, which renders a subsequent adjustment unnecessary. In particular, optical lenses may be concomitantly molded in its initial region and/or in its end piece. The lenses may also have a plastic material, but the latter differs from the plastic waveguide in terms of its refractive behavior to produce a focusing or defocusing effect.

The insertion region of the housing may be utilized both optoelectronically and electro-optically. The difference between these two insertion regions resides merely in the processing direction of the optical signals. While an element which converts electrical signals into optical signals can be inserted in an electro-optical insertion region, an element which converts optical signals into electrical signals is inserted in an optoelectronic insertion region. These insertion regions may, in the housing, both be accessible externally and be incorporated with a cavity equipped with an optoelectronic unit within the housing.

Unhoused optical transmission and/or reception diodes in the form of semiconductor chips may be arranged in the cavity, the optically active areas of the diodes being oriented toward corresponding plastic waveguides, and the electrodes and/or contact areas of the diodes being electrically connected to the three-dimensional conductor structure. Such an embodiment of the invention yields a micro-optical module which is constructed compactly and enables an optoelectronic or electro-optical conversion of signals in an extremely small space.

The cavity in the MID body may have a partition separating the cavity into a transmission region and a reception region. Such a partition is intended to prevent crosstalk from the transmission region to the reception region and has a metallic shielding layer for this purpose. On the other hand, the partition may also serve for the positioning of components of the optoelectronic unit which are to be cooled over a large area and/or are to be connected to a ground potential over a large area.

It is furthermore possible for metallic heat sinks to be concomitantly molded into the MID body, on which heat sinks it is possible to apply optoelectronic components having a high heat loss. The effect of such molded-in heat sinks can be reinforced by virtue of their being thermally conductively connected to an outer shielding layer of the housing.

The molded housing may have, in the bottom region of the cavity, a printed circuit board with active and passive circuit elements with a conductor structure which interacts with the conductor structures at the walls of the cavity. Instead of a printed circuit board, flat conductor structures may also be molded in the MID body, which constitute on the one hand an electrical connection and on the other hand a thermally conductive connection toward the outside. Furthermore, provision may be made of through-contact lines through the walls of the MID body, which are connected to corresponding external electrical contacts on the outer side of the housing. Since these components are mechanically connected to one another at the same time as a molding or compression molding process of the MID body, there is no need for any subsequent adjustment or setting on the micro-optical module.

A method for producing a micro-optical module includes the following. First, a three-dimensional optical waveguide is injection-molded. The designation three-dimensional in this case relates to the course of the central axis of the waveguide, which may be constructed in multiply curved and sinuous fashion. Afterward, the waveguide and a three-dimensional line structure are introduced, oriented and positioned in an injection mold for a housing with a cavity. This is followed by the injection-molding at least partly of a housing embodied as an MID body. The introduced, positioned and oriented optoelectronic semiconductor chips and the lines of the three-dimensional conductor structure which are present in the injection mold form a mechanically fixed structural unit which does not have to be subsequently adjusted.

The three-dimensional conductor structure may also be applied into the cavity or onto the surfaces and onto the walls of the cavity after the injection-molding of the MID body. This gives rise to a conductor structure with conductor track layers running on the walls of the cavity. The cavity of the housing can then be equipped with at least one optoelectronic component and also an optoelectronic unit. While the optoelectronic component may be an active laser diode or an active photodiode, the optoelectronic unit comprises both passive and active components, such as integrated circuits, which process the electrical signals of the optoelectronic component.

The effect of the plastic waveguide may be amplified if, prior to the injection-molding of the molded housing, the waveguide is sheathed with a reflective layer. Such a reflective layer ensures a high jump in refractive index and amplifies the accumulation of the beam within the optical channel of the micro-optical module.

Optical coupling elements may be molded onto the ends of the waveguide prior to the injection-molding of the molded housing. If the coupling elements comprise a transparent plastic, the latter has a different refractive index than the waveguide end to enable focusing or defocusing of the optical beam that is guided by the plastic waveguide in the optical channel of the micro-optical module.

To summarize, the integration of optical, mechanical and electrical functions in a micro-optical module makes it possible to realize an optical transmitter which has the following advantages: simple mounting and adjustment through omission of discrete individual components such as printed circuit boards, lenses, plug-in units or housed optoelectronic components; realization of an integral overall system instead of individual components that have to be assembled and adjusted; the possibility of easily changing the design at higher data rates with new electronic components; the possibility of mounting using the surface mounted device (SMD) technique; the possibility of SMD mounting by solderable external contact areas or by solder balls; and a molded interconnect device (MID) body serves as the functional carrier for all required electrical, optical and mechanical properties.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention will now be explained in more detail with reference to the accompanying figures.

DETAILED DESCRIPTION

Figure 1:
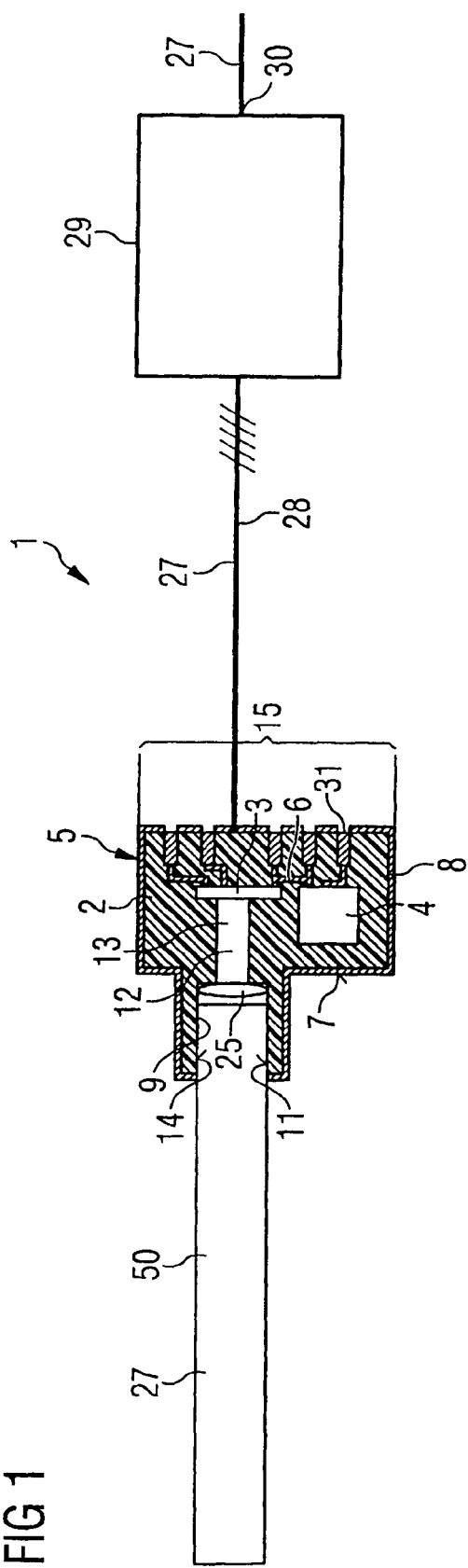
FIG. 1 shows a basic schematic diagram of a micro-optical module in an optoelectronic line path in accordance with a first embodiment of the invention.

FIG. 1 shows a basic schematic diagram of a micro-optical module 1 in an optoelectronic line path 27. The line path 27 has an external radiation conductor 50, the micro-optical module 1, electrical connecting lines 28, such as a multicore bus, a printed circuit board 29 with an evaluation circuit, and an electro-optical interface to an optical axis 30 which leads on further.

The micro-optical module 1 has a molded interconnect device (MID) body 5, which encloses a molded-in plastic waveguide 12 in an optical channel 13. Furthermore, the MID body 5 has a conductor structure 6 in a cavity, which conductor structure connects at least one optoelectronic component 3 to an optoelectronic unit 4 and to an electrical connection region 15 with external contacts 31 of the micro-optical module.

In an insertion region 11, the micro-optical module 1 has an optoelectronic insertion region 14. The external radiation conductor 50 of the optoelectronic line path 27 is inserted into the optoelectronic insertion region 14 into a receptacle opening 9. For an optical coupling between external radiation conductor 50 and internal plastic waveguide 12, an optical channel 13 in the MID body 5 has an optical coupling element 25, which is a lens molded into the MID body. The lens focuses the beams onto the plastic waveguide 12, which are converted into electrical energy by the optoelectronic component 3 at the end of the plastic waveguide 12.

If optical signals are transmitted via the external radiation conductor 50, the optical coupling element 25 and the plastic waveguide 12 to the optoelectronic component 3, then the optoelectronic component 3 converts the optical signals into electrical signals. The electrical signals are output via the conductor structure 6 and the optoelectronic unit 4 onto the line bus of the electrical connecting line 28 via the external contacts 31 of the micro-optical module 1 to the input of the printed circuit board 29.

Figure 2:
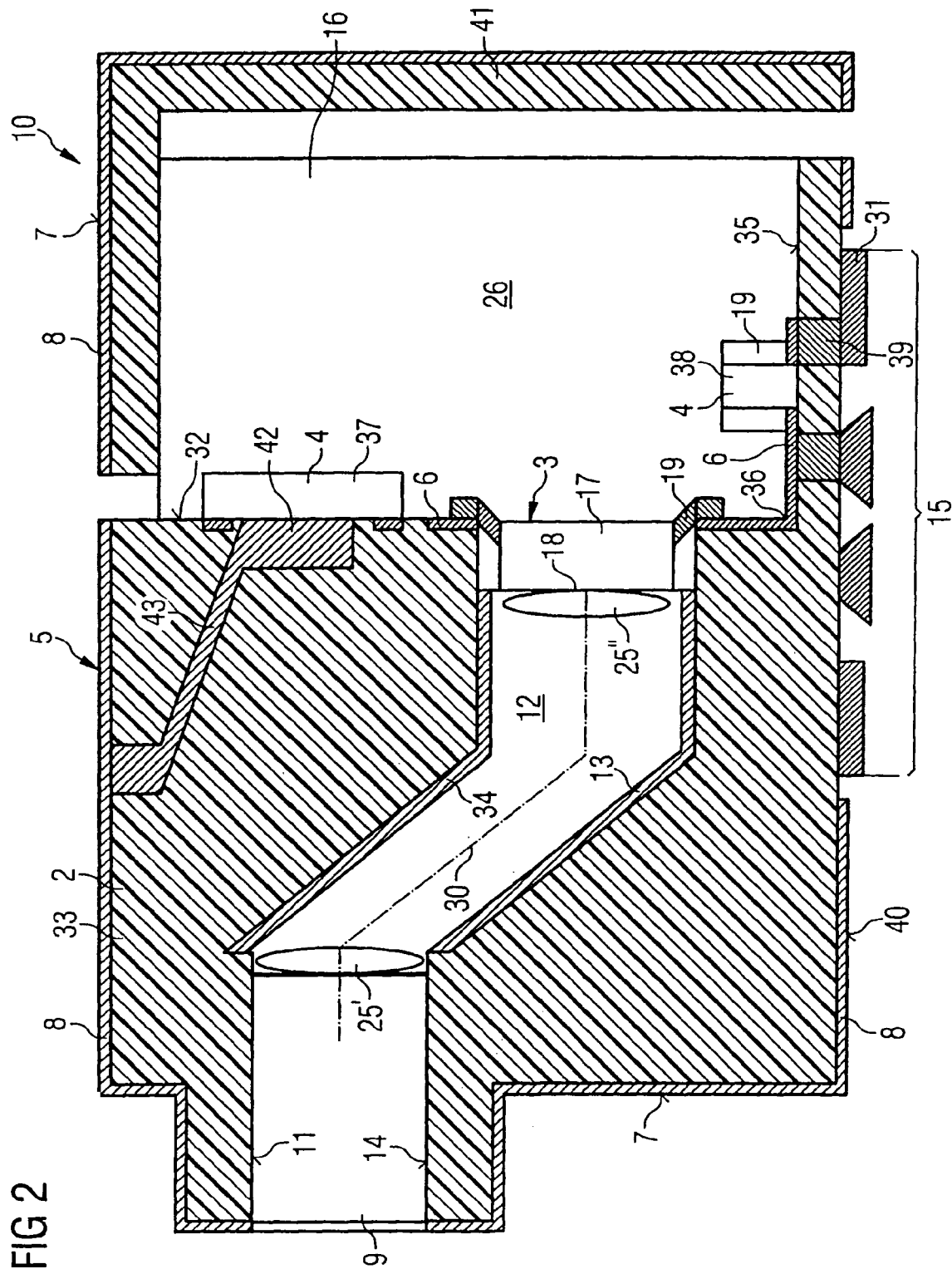
FIG. 2 shows a schematic cross section through a micro-optical module in accordance with a second embodiment of the invention.

FIG. 2 shows a schematic cross section through a micro-optical module 10 of a second embodiment of the invention. Components having functions identical to those in FIG. 1 are identified by the same reference symbols and are not discussed separately.

The micro-optical module 10 has a housing 2, which comprises a molded MID body and is covered by a shielding layer 8 on its outer wall 7. The shielding layer 8 comprises its shielding metal and protects the micro-optical module 10 from magnetic and electromagnetic stray radiation and also from optical radiation, so that even a day/night change does not impair the functionality of the micro-optical module 10.

An optical channel 13 is provided in the MID body 5. The optical channel is filled by a plastic waveguide 12 and has a bent optical axis 30 that is spatially curved and thus forms a three-dimensional plastic waveguide. Arranged at the optical coupling-in and coupling-out ends of the plastic waveguide 12 are optical coupling elements 25 in the form of lenses which are molded into the plastic waveguide 12. The cladding surface of the plastic waveguide 12 is surrounded by a reflective layer 34.

The reflective layer 34 is applied prior to the embedding of the plastic waveguide 12 in a plastics composition 33 of the MID body 5. An outer coupling element 25' molded into the waveguide 12 is positioned in the insertion region 11 of the housing 2. The insertion region 11 is dimensioned with a receptacle opening 9 in such a way that a single optical fiber of a multicore radiation conductor can be inserted there. The insertion region 11 of the micro-optical module 10 is an optoelectronic insertion region 14. By contrast, an inner optical coupling element 25" molded in the inner end of the plastic waveguide is arranged toward a cavity 26 of the MID body 5. An optoelectronic component 3 having an optically active area 18 is connected to the inner coupling element 25". The optoelectronic component is able to convert optical signals that are coupled in via the optical coupling element into electrical signals that are passed to a three-dimensional conductor structure 6 via electrodes 19.

The three-dimensional conductor structure 6 is arranged in a cavity of the MID body 5 and extends over the inner walls 32 and 35 of the cavity and connects, via cavity corners 36, correspondingly spatially arranged components 37, 38 of an optoelectronic unit 4, which in this embodiment has at least one semiconductor chip 37 and a passive component 38, such as a matching resistor. Furthermore, the three-dimensional conductor structure 6 is connected to through contacts 39 through the plastics composition 33, which connect the three-dimensional conductor structure 6 to external contacts 31 of the micro-optical module 10.

In this embodiment of the invention, the external contacts 31 are arranged on an underside 40 of the housing 2 in an electronic connection region 15. It is thus possible to use the micro-optical module 10 as an SMD device. Such SMD devices are characterized in that they are arranged as surface mounted devices on a surface of a superordinate circuit board and are electrically connected thereto.

While the conductor structure 6 is introduced as early as during the molding process for the MID body 5 or, by vapor deposition and patterning, is subsequently applied to the inner walls 32 and 35 of the cavity 16 and patterned, it is not until after the molding process for the MID body 5 that the components of the optoelectronic unit 4 and also the optoelectronic component 3 are introduced and adjusted. In order to facilitate access to the cavity 16, an angular cover 41 is provided, which is molded from a plastics composition and is covered with a shielding layer 8 on its outer wall 7.

As a further particular feature of this embodiment of the invention, the IC component of the optoelectronic unit 4 is applied as semiconductor chip 37 on a heat sinks 42 made of metal. The heat sinks 42 is connected via a thermally conductive path 43 to the shielding layer 8 in order to increase the cooling effect. The thermally conductive path 43 and the heat sinks 42 are molded into the plastics composition 33 together with the plastic waveguide 12 during the molding process for forming the MID body 5. In this embodiment of the invention, the micro-optical module 10 constitutes a compact device that is coordinated with the dimensions of individual radiation conductor fibers in the range of fractions of a millimeter, the housing 2 taking up only a few millimeters in height, width and depth.

Figure 3:
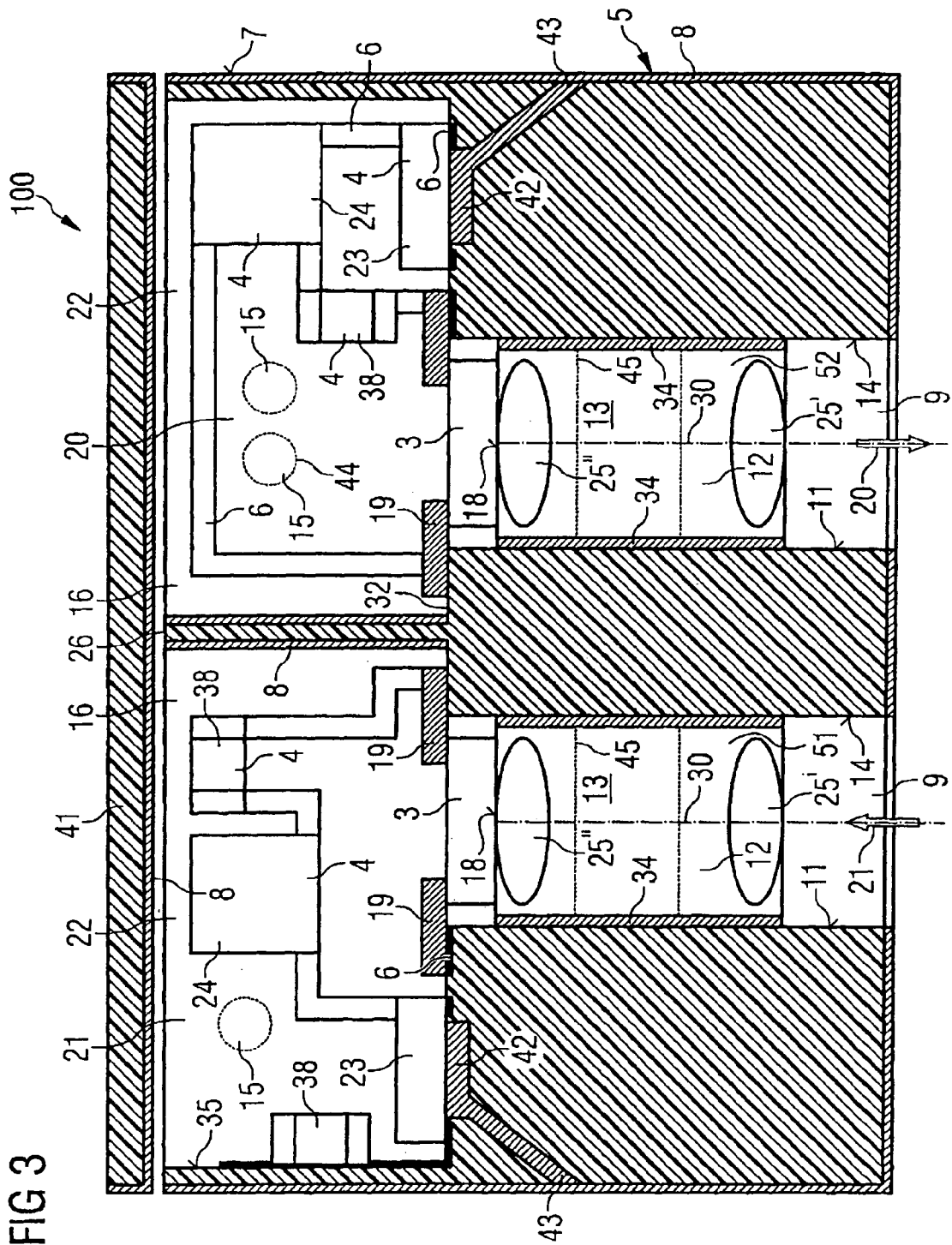
FIG. 3 shows a schematic cross section through a micro-optical module in accordance with a third embodiment of the invention.

FIG. 3 shows a schematic cross section through a micro-optical module 100 of a third embodiment of the invention. Components having functions identical to those in the previous figures are identified by the same reference symbols and are not discussed separately.

The micro-optical module 100 of the third embodiment of the invention differs from the micro-optical module 10 of the second embodiment of the invention in accordance with FIG. 2 by virtue of the fact that this micro-optical module 100 has two regions, namely a transmission region 20 and a reception region 21. In the transmission region 20, the optoelectronic component 3 is a light emitting diode or a laser diode. By contrast, the optoelectronic component 3 in the reception region 21 is a photodiode or a phototransistor. Both the transmission region 20 and the reception region 21 each have an optical channel 13 filled with a plastic waveguide 12, optical coupling elements 25' and 25" effecting an adaptation of the optical properties in the transmission region 20 and in the reception region 21, respectively. In order to attenuate and/or prevent crosstalk, a partition 26 is arranged between the transmission region 20 and the reception region 21, the partition being provided with a shielding layer 8. Active switching elements 23 and 24, associated with the optoelectronic unit 4, and also passive components 38 are arranged in the cavities separated by the partition 26. In this case, a printed circuit board piece 22 forms the bottom of each cavity 16. A three-dimensional conductor structure 6 provides for conductor tracks to be arranged both in the bottom region and on the inner walls 32 and 35 of the cavities 16.

Both the housing cover 41 and the housing 2 are covered with a shielding layer 8, which is electrically connected to the shielding layer 8 on the partition 26 when the MID body 5 is covered by the housing cover 41. Through contacts for the electrical connection regions 15 toward the outside are shown by dotted lines 44 in the printed circuit board regions 22. The dotted lines 45 in the region of the plastic waveguides 12, on the other hand, show the bending of the optical axis 30 of the waveguides 12.

To produce such a micro-optical module 100, first the three-dimensional optical waveguides 50 and 51 are injection-molded with coupling elements 25' and 25" arranged at their ends. Afterward, reflective layers 34 made of metal are applied to the cladding surfaces of the waveguides 51 and 52. Furthermore, heat sinks structures 42 with thermally conductive paths 43 are produced in preparatory fashion and then the internal plastic waveguides 51 and 52 and also the heat sinks 42 with their thermally conductive paths 43 are arranged in a mold.

If the three-dimensional conductor structure 6 is a self-supporting structure comprising flat conductors, the latter may also already be positioned and arranged in the mold. Afterward, the MID body is then molded and the plastic waveguides 51 and 52, their coupling elements 25' and 25", the heat sinks 42, and the three-dimensional conductor structure are then finally embedded in a plastics composition 33.

A shielding layer 8 is then applied to the outer wall 7 of the MID body 5, the shielding layer also being applied to the partition 26 and the cover 41, in order to protect the micro-optical module 100 from crosstalk, magnetic and electronic waves, in particular optical stray radiation. The inner walls 32 and 35 and the bottom region of the cavities 16 are then equipped with active switching elements 23 and 24 and also with passive components 38 of the optoelectronic unit 4. The optoelectronic components 3 can also be fitted, adjusted and fixed. The fitting of the correspondingly prepared housing cover 41 completes the production of a corresponding micro-optical module 100.

Having described preferred embodiments of new and improved micro-optical modules, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A micro-optical module, comprising:
   a housing at least partly embodied as a molded interconnect device (MID) body;
   at least one optoelectrical component molded in the MID body;
   an optoelectronic unit associated with the at least one optoelectrical component;
   a three-dimensional conductor structure including through contacts embedded in the MID body and external contacts positioned on the outer surface of the MID body, wherein the conductor structure provides an electrical contact between the optoelectronic unit and the at least one optoelectronic component; and
   at least one cavity surrounded by walls in the interior of the housing, wherein the walls comprise a portion of the conductor structure and are equipped with at least some components of the optoelectronic unit.

2. The micro-optical module of claim 1, wherein the housing includes an outer wall comprising a shielding layer.

3. The micro-optical module of claim 1, wherein the housing comprises at least one receptacle opening for inserting a radiation conductor in an insertion region.

4. The micro-optical module of claim 3, wherein the housing comprises at least one optical channel that is filled with a plastic waveguide and is optically coupled to the receptacle opening.

5. The micro-optical module of claim 3, wherein the receptacle opening comprises a lens.

6. The micro-optical module of claim 1, wherein the housing comprises an electro-optical and an optoelectronic insertion region.

7. The micro-optical module of claim 1, wherein optical transmission and/or reception diodes are arranged in the cavity, optically active areas of the diodes are oriented toward corresponding plastic waveguides, and electrodes of the diodes are electrically connected to the conductor structure.

8. The micro-optical module of claim 1, wherein the cavity comprises a partition separating the cavity into a transmission region and a reception region.

9. The micro-optical module of claim 1, wherein the housing has a bottom comprising a printed circuit board with passive and active circuit elements and conductor structures.

* * * * *